US012759528B2

(12) United States Patent
Bagga et al.

(10) Patent No.: US 12,759,528 B2
(45) Date of Patent: Oct. 13, 2026

(54) METHOD TO EFFECTIVELY PREDICT TIRE SATURATION FOR EVASIVE STEERING AND ACTIVE SAFETY CONTROL

(71) Applicant: GM Global Technology Operations LLC, Detroit, MI (US)

(72) Inventors: Puneet Bagga, Etobicoke (CA); Ami Woo, Calgary (CA); Reza Zarringhalam, Whitby (CA); Mohammadali Shahriari, Markham (CA); Hassan Askari, Thornhill (CA); Abed Shammaa, Toronto (CA); Kin Man Michael Wong, Thornhill (CA)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 123 days.

(21) Appl. No.: 18/786,965

(22) Filed: Jul. 29, 2024

(65) Prior Publication Data

US 2026/0028013 A1 Jan. 29, 2026

(51) Int. Cl.
*B60W 10/20* (2006.01)

(52) U.S. Cl.
CPC ....... *B60W 10/20* (2013.01); *B60W 2520/125* (2013.01); *B60W 2520/14* (2013.01); *B60W 2540/18* (2013.01)

(58) Field of Classification Search
CPC ........... B60W 10/20; B60W 2520/125; B60W 2520/14; B60W 2540/18
See application file for complete search history.

(56) References Cited

U.S. PATENT DOCUMENTS 4,715,662 A * 12/1987 van Zanten ............. B60T 8/172 701/80
4,984,165 A * 1/1991 Muller .................... B60T 8/175 701/75
5,747,682 A * 5/1998 Hirano ................ B60T 8/17551 73/115.07

(Continued)

FOREIGN PATENT DOCUMENTS

GB 2584587 A 12/2020

OTHER PUBLICATIONS

German Office Action for German Application No. 102024126806.9; dated Jul. 1, 2025; 6 pages.

*Primary Examiner* — Lindsay M Low
*Assistant Examiner* — Brian R Kirby
(74) *Attorney, Agent, or Firm* — CANTOR COLBURN LLP

(57) ABSTRACT

A system operates a method for steering a vehicle. A sensor obtains a first stream of data related to road wheel angle for the vehicle and a second stream of data related to lateral acceleration for the vehicle. A processor determines a reduced tire model for the vehicle using the first stream of data and the second stream of data, obtains a measurement of a current road wheel angle and a measurement of a current lateral acceleration, determines a current slope from the current road wheel angle and the current lateral acceleration, compares the current slope to the reduced tire model to predict a level of saturation of a tire of the vehicle, and controls a steering actuator of the vehicle to steer the vehicle based on the level of saturation of the tire.

20 Claims, 12 Drawing Sheets

(56) References Cited

U.S. PATENT DOCUMENTS

| | | | | | |
|---|---|---|---|---|---|
| 7,197,380 | B2 * | 3/2007 | Fangeat | B60T 8/17551 | 701/72 |
| 7,454,279 | B2 * | 11/2008 | Fujioka | B62D 6/005 | 340/463 |
| 8,666,626 | B2 * | 3/2014 | Futamura | B60T 8/1755 | 701/87 |
| 2002/0013652 | A1 * | 1/2002 | Yasui | B60T 8/172 | 701/80 |
| 2002/0183913 | A1 * | 12/2002 | Ehret | B60T 8/17552 | 701/72 |
| 2004/0019417 | A1 * | 1/2004 | Yasui | B60T 8/172 | 701/80 |
| 2004/0024514 | A1 * | 2/2004 | Levy | G05B 13/024 | 701/82 |
| 2004/0032165 | A1 * | 2/2004 | Levy | B60T 8/172 | 303/150 |
| 2004/0133324 | A1 * | 7/2004 | Yasui | B60T 8/172 | 701/41 |
| 2005/0216155 | A1 * | 9/2005 | Kato | B62D 5/008 | 180/408 |
| 2006/0041365 | A1 * | 2/2006 | Mori | B60W 40/068 | 701/70 |
| 2008/0262677 | A1 * | 10/2008 | Komori | B60W 40/103 | 701/41 |
| 2010/0114449 | A1 * | 5/2010 | Shiozawa | B62D 6/005 | 701/90 |
| 2011/0106458 | A1 * | 5/2011 | Shiozawa | B60W 40/101 | 702/41 |
| 2012/0029783 | A1 * | 2/2012 | Takenaka | B60T 8/172 | 701/73 |
| 2012/0179327 | A1 * | 7/2012 | Yngve | B60W 40/064 | 701/32.9 |
| 2013/0079988 | A1 * | 3/2013 | Hirao | B60W 10/184 | 701/38 |
| 2020/0017139 | A1 | 1/2020 | Ramanujam et al. | | |
| 2020/0039523 | A1 * | 2/2020 | Ghasemalizadeh | B60W 50/0098 | |
| 2021/0309289 | A1 * | 10/2021 | Ueno | B62D 5/0421 | |
| 2022/0017118 | A1 * | 1/2022 | Shinomoto | B60W 30/0953 | |
| 2023/0139179 | A1 | 5/2023 | Askari et al. | | |

* cited by examiner

METHOD TO EFFECTIVELY PREDICT TIRE SATURATION FOR EVASIVE STEERING AND ACTIVE SAFETY CONTROL

INTRODUCTION

The subject disclosure relates to operation of a vehicle and, in particular, to a system and method of predicting a level of tire saturation at the vehicle and adjusting an operation of the vehicle based on the predicted level of tire saturation.

When a vehicle turns, whether at a curve in a road or on any terrain, the forces on the tire can approach a full saturation level for the tire. Once the tires are saturated, the vehicle operates in a non-linear region of operation. The safety of operating the vehicle in the non-linear region is of concern to an operator, driver or passenger of the vehicle. In general, the operator does not have any knowledge of the saturation level of a tire and therefore is unable to take an appropriate action to prevent tire saturation. Accordingly, it is desirable to provide a system and method for predicting a saturation level of the tire and controlling a trajectory of the vehicle to maintain operation of the vehicle in a linear region.

SUMMARY

In one exemplary embodiment, a method of operating a vehicle is disclosed. A first stream of data is obtained related to road wheel angle for the vehicle. A second stream of data is obtained related to lateral acceleration for the vehicle. A reduced tire model is determined for the vehicle using the first stream of data and the second stream of data. A measurement of a current road wheel angle and a measurement of a current lateral acceleration are obtained. A current slope is determined from the current road wheel angle and the current lateral acceleration. The current slope is compared to the reduced tire model to predict a level of saturation of a tire of the vehicle. A steering actuator of the vehicle is controlled to steer the vehicle based on the level of saturation of the tire.

In addition to one or more of the features described herein, the method further includes shifting the first stream of data in time to generate a third stream of data including time-shifted road wheel angle data, the third stream of data aligned with the second stream of data and determining the reduced tire model using the third stream of data and the second stream of data.

In addition to one or more of the features described herein, the reduced tire model includes a normal slope and a traction limit slope and the method further includes comparing the current slope to the normal slope and the traction limit slope to predict the level of saturation.

In addition to one or more of the features described herein, the method further includes learning a yaw relation model for the vehicle and adjusting a model parameter of an adaptive vehicle model based on a comparison of a current yaw slope to a normal yaw slope of the yaw relation model and a yaw limit slope of the yaw relation model.

In addition to one or more of the features described herein, the method model parameter includes at least one of a front axle tire capacity and a rear axle tire capacity.

In addition to one or more of the features described herein, the method further includes sending a signal to a display when one of a predicted tire capacity is near a traction limit and the predicted tire capacity is near the traction limit and a yaw rate has deviated from a desired yaw rate.

In addition to one or more of the features described herein, the method further includes adding a safety margin in excess of a maximum lateral deviation allowed by the reduced tire model to obtain a target trajectory for the vehicle when a lateral deviation of a reference trajectory exceeds the maximum lateral deviation.

In another exemplary embodiment, a system for operating a vehicle is disclosed. The system includes a sensor for obtaining a first stream of data related to road wheel angle for the vehicle and a second stream of data related to lateral acceleration for the vehicle and a processor. The processor is configured to determine a reduced tire model for the vehicle using the first stream of data and the second stream of data, obtain a measurement of a current road wheel angle and a measurement of a current lateral acceleration, determine a current slope from the current road wheel angle and the current lateral acceleration, compare the current slope to the reduced tire model to predict a level of saturation of a tire of the vehicle, and control a steering actuator of the vehicle to steer the vehicle based on the level of saturation of the tire.

In addition to one or more of the features described herein, the processor is further configured to shift the first stream of data in time to generate a third stream of data including time-shifted road wheel angle data, the third stream of data aligned with the second stream of data and determining the reduced tire model using the third stream of data and the second stream of data.

In addition to one or more of the features described herein, the reduced tire model includes a normal slope and a traction limit slope and the processor is further configured to compare the current slope to the normal slope and the traction limit slope to predict the level of saturation.

In addition to one or more of the features described herein, the processor is further configured to learn a yaw relation model for the vehicle and adjust a model parameter of an adaptive vehicle model based on a comparison of a current yaw slope to a normal yaw slope of the yaw relation model and a yaw limit slope of the yaw relation model.

In addition to one or more of the features described herein, the model parameter includes at least one of a front axle tire capacity and a rear axle tire capacity.

In addition to one or more of the features described herein, the processor is further configured to send a signal to a display when one of a predicted tire capacity is near a traction limit and the predicted tire capacity is near the traction limit and a yaw rate has deviated from a desired yaw rate.

In addition to one or more of the features described herein, the processor is further configured to add a safety margin in excess of a maximum lateral deviation allowed by the reduced tire model to obtain a target trajectory for the vehicle when a lateral deviation of a reference trajectory exceeds the maximum lateral deviation.

In yet another exemplary embodiment, a vehicle is disclosed. The vehicle includes a sensor for obtaining a first stream of data related to road wheel angle for the vehicle and a second stream of data related to lateral acceleration for the vehicle, a steering actuator for steering the vehicle, and a processor. The processor is configured to determine a reduced tire model for the vehicle using the first stream of data and the second stream of data, obtain a measurement of a current road wheel angle and a measurement of a current lateral acceleration, determine a current slope from the current road wheel angle and the current lateral acceleration, compare the current slope to the reduced tire model to predict a level of saturation of a tire of the vehicle, and control the steering actuator to steer the vehicle based on the level of saturation of the tire.

In addition to one or more of the features described herein, the processor is further configured to shift the first stream of data in time to generate a third stream of data including time-shifted road wheel angle data, the third stream of data aligned with the second stream of data and determining the reduced tire model using the third stream of data and the second stream of data.

In addition to one or more of the features described herein, the reduced tire model includes a normal slope and a traction limit slope and the processor is further configured to compare the current slope to the normal slope and the traction limit slope to predict the level of saturation.

In addition to one or more of the features described herein, the processor is further configured to learn a yaw relation model for the vehicle and adjust a model parameter of an adaptive vehicle model based on a comparison of a current yaw slope to a normal yaw slope of the yaw relation model and a yaw limit slope of the yaw relation model.

In addition to one or more of the features described herein, the processor is further configured to send a signal to a display when one of a predicted tire capacity is near a traction limit and the predicted tire capacity is near the traction limit and a yaw rate has deviated from a desired yaw rate.

In addition to one or more of the features described herein, the processor is further configured to add a safety margin in excess of a maximum lateral deviation allowed by the reduced tire model to obtain a target trajectory for the vehicle when a lateral deviation of a reference trajectory exceeds the maximum lateral deviation.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
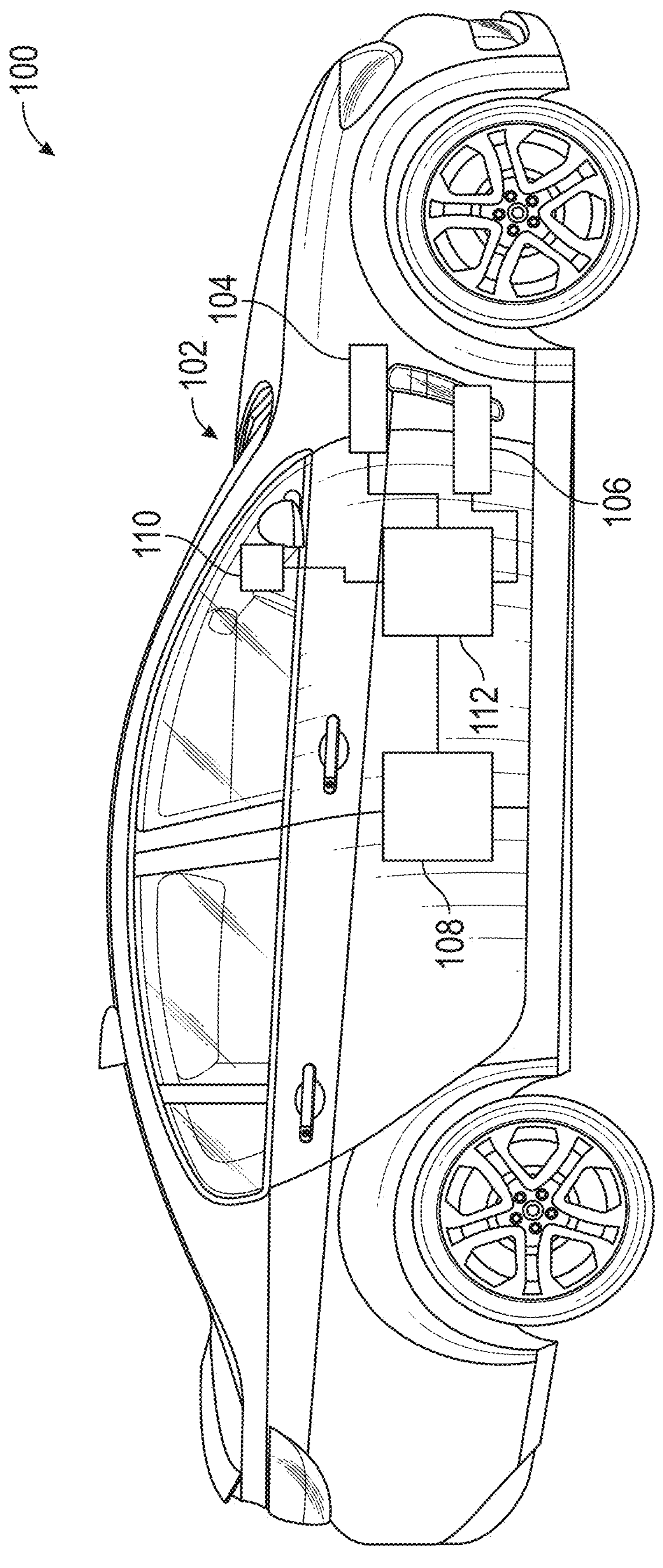
FIG. 1 shows a vehicle in accordance with an exemplary embodiment.

The following description is merely exemplary in nature and is not intended to limit the present disclosure, its application or uses. It should be understood that throughout the drawings, corresponding reference numerals indicate like or corresponding parts and features. As used herein, the term module refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

In accordance with an exemplary embodiment, FIG. 1 shows a vehicle 100. The vehicle 100 can be an autonomous vehicle, a vehicle with cruise control, a vehicle with steering assist, etc. The vehicle 100 includes a steering control system 102 that controls steering of the vehicle. The steering control system 102 can be part of an autonomous driving system or of an Advanced Driver Assistance System (ADAS) or other suitable system for driver assistance. The steering control system 102 includes an inertial measurement unit 104 (IMU), a steering angle sensor 106, a steering actuator 108, a display 110 and a controller 112. The inertial measurement unit 104 (IMU) measures a lateral acceleration $a_y$ of the vehicle 100, and the steering angle sensor 106 measures a road wheel angle $\delta_{rwa}$ (or steering angle) of the vehicle. The inertial measurement unit 104 can also measure a yaw rate $\omega_2$ of the vehicle 100. The steering actuator 108 controls various components for steering the vehicle, including controlling a steering column (not shown). The display 110 can show messages, instructions or illustrations to an operator of the vehicle 100 based on the results of the calculations disclosed herein.

The controller 112 receives measurements from the inertial measurement unit 104 and the steering angle sensor 106 and performs calculations to determine a level of saturation for tires of the vehicle and to control the steering actuator 108 to perform a steering of the vehicle based on the results of the level of saturation. The controller 112 may include processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality. The controller 112 may include a non-transitory computer-readable medium that stores instructions which, when processed by one or more processors of the controller 112, implement a method of learning a reduced tire model based on online measurements of lateral acceleration and road wheel angle, comparing a current slope between lateral acceleration and road wheel angle to a slope of the reduced tire model to predict a level of saturation of a tire and/or an approach of the vehicle to full tire saturation at which the vehicle operates in a non-linear region, and controlling the steering actuator 108 to steer the vehicle based on the predicted level of saturation of the tire, according to one or more embodiments detailed herein.

Figure 2:
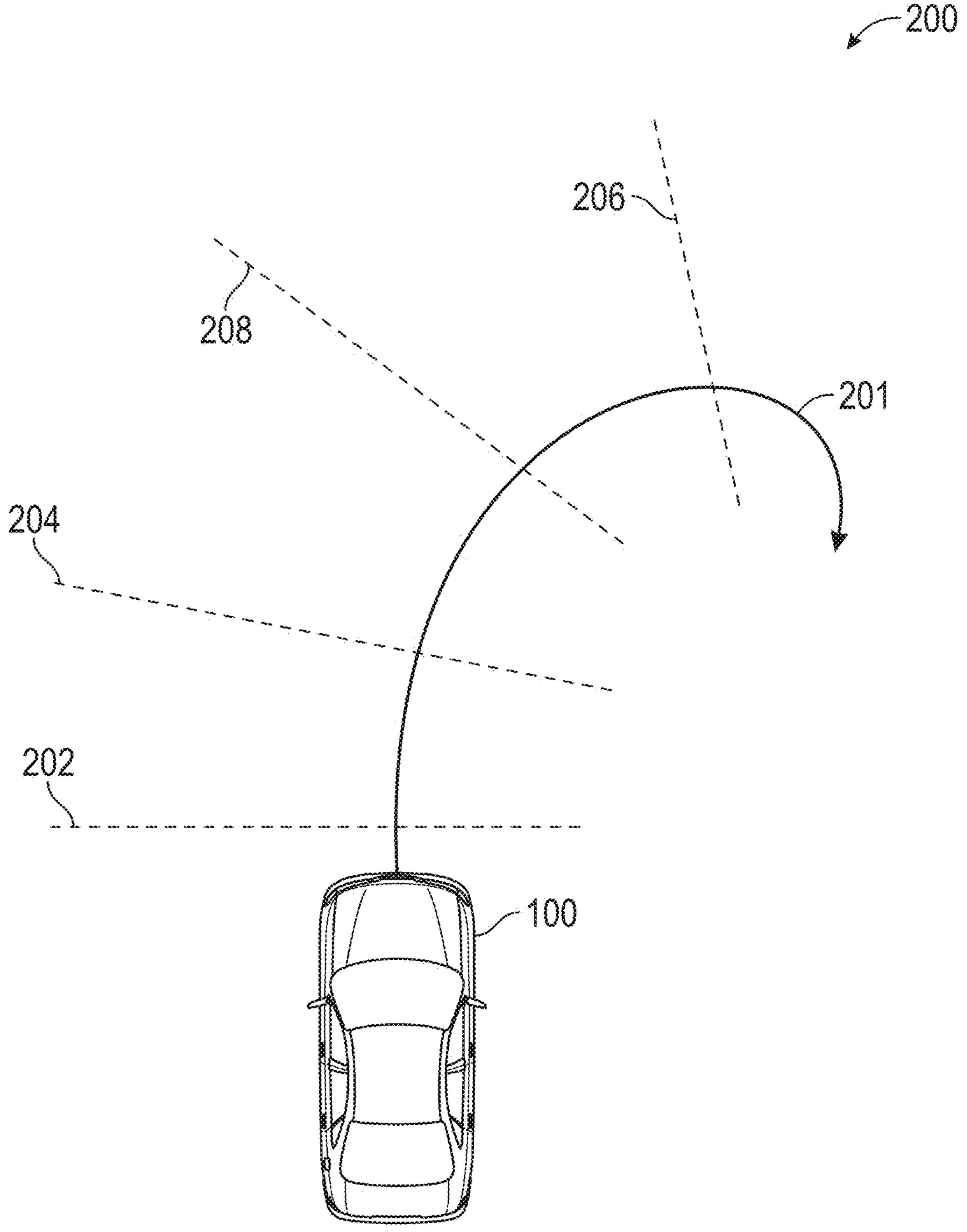
FIG. 2 shows a top view of the vehicle performing a turning maneuver.

FIG. 2 shows a top view 200 of the vehicle 100 performing a turning maneuver. For illustrative purposes, the vehicle is travelling along a trajectory 201 having a curvature that continuously increases. At point 202, the vehicle 100 is traveling along a straight-line trajectory. At point 204, the vehicle begins to turn. At point 206, the trajectory has reached a curvature such that the tires of the vehicle have become saturated. The method disclosed herein predicts the level of remaining tire capacity at a time (or point on the trajectory) before the tires become saturated, as shown at point 208.

Figure 3:
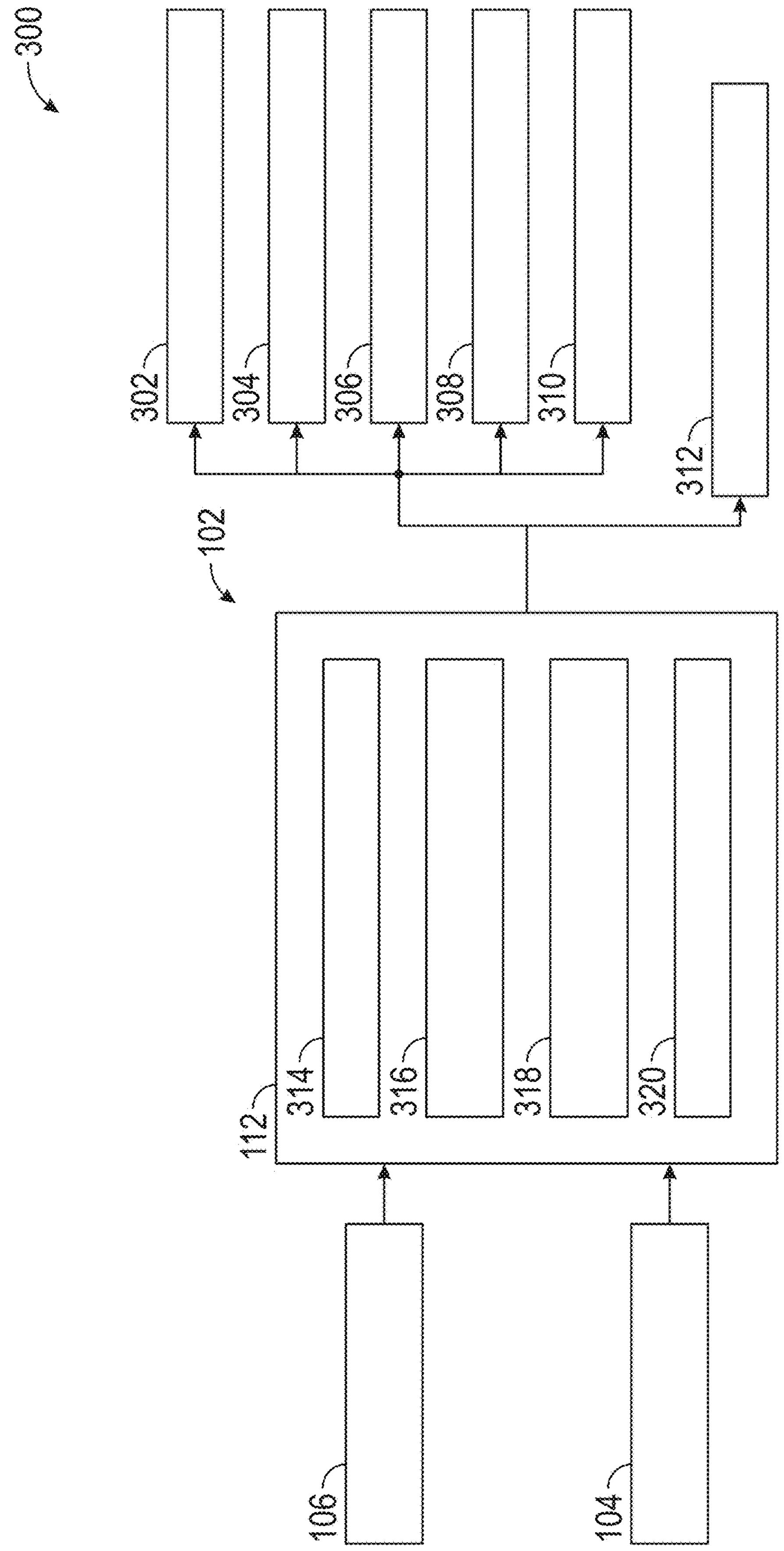
FIG. 3 is diagram showing details of the steering control system, in an illustrative embodiment.

FIG. 3 is diagram 300 showing details of the steering control system 102, in an illustrative embodiment. The diagram 300 shows the inertial measurement unit 104 (IMU), the steering angle sensor 106, and the controller 112, as well as various steering actuators, including autonomous cruise control 302, super cruise 304, Smart System Learning 306, Hands-On Lane Center Assist 308, automatic lane change 310, and Assisted Evasive Steering system 312, for example.

The inertial measurement unit 104 feeds lateral acceleration measurements to the controller 112, and the steering angle sensor 106 feeds road wheel angle measurements to the controller. The controller 112 operates various modules for predicting a tire capacity for the vehicle. The modules can include, but are not limited to, a data alignment module 314, a tire capacity curve learning module 316, an operating range learning module 318, and a tire capacity prediction module 320. The data alignment module 314 temporally aligns the road wheel angle measurements with corresponding lateral acceleration measurements. The tire capacity curve learning module 316 learns or determines a reduced tire model based on a relation between the lateral acceleration measurements and the temporally aligned road wheel angle measurements. The operating range learning module 318 learns or determines a current slope related to current operation of the vehicle within the reduced tire model. The current slope corresponds to, or is determined using, current lateral acceleration and a temporally-aligned road wheel angle. The tire capacity prediction module 320 predicts a remaining tire capacity of the vehicle (or a level of saturation of the tire) by comparing the current slope to a slope of the reduced tire model. The predicted remaining tire capacity is output to one or more of steering actuators.

The predicted remaining tire capacity can be used to determine if the vehicle is operating within a standard (linear) operating range or within a non-linear operating range. A prediction that the vehicle is operation within a non-linear operating range can affect operation of the autonomous cruise control 302, super cruise 304, Smart System Learning 306, Hands-On Lane Center Assist 308, and automatic lane change 310. Any operating range of the tire can be used to control the Assisted Evasive Steering system 312.

Figure 4:
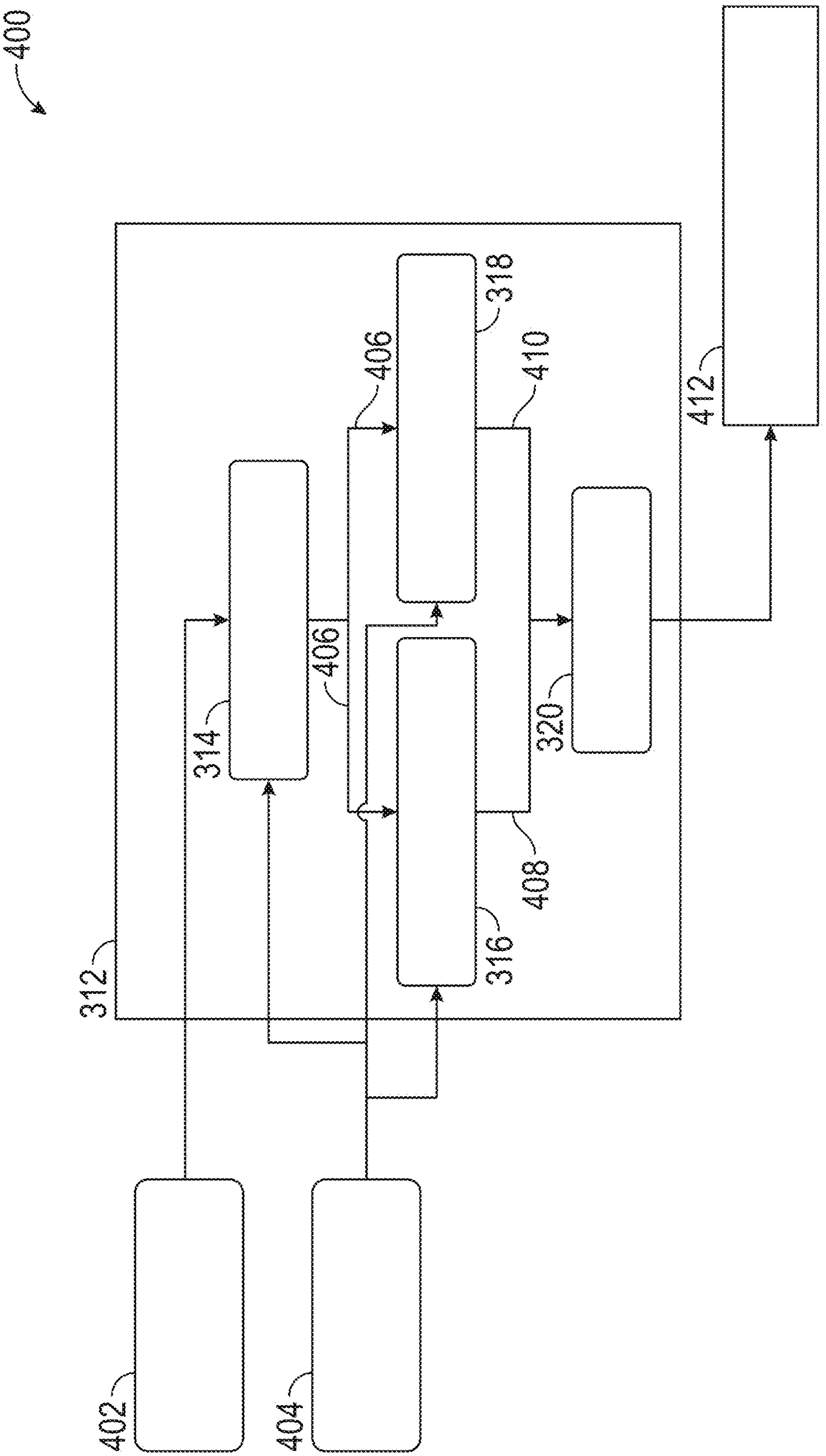
FIG. 4 shows a diagram illustrating operation of the modules of the controller for predicting a current tire capacity.

FIG. 4 shows a diagram 400 illustrating operation of the modules of the controller 112 for predicting a current tire capacity. The method includes receiving the road wheel angle data 402 and lateral acceleration data 404 at the data alignment module 314. The road wheel angle data 402 is a first stream of angle measurements obtained over a time duration and the lateral acceleration data 404 is a second stream of acceleration measurements obtained over the time duration. The data alignment module 314 determines a time delay between the first stream and the second stream and temporally aligns the first stream with the second stream such that a selected road wheel angle is temporally aligned with a corresponding lateral acceleration. The data alignment module 314 outputs a third stream of data including time-shifted road wheel angle data 406.

The tire capacity curve learning module 316 uses the time-shifted road wheel angle data 406 and the lateral acceleration data 404 to determine a reduced tire model. The tire capacity curve learning module 316 can use a selection of the time-shifted road wheel angle data 406 and the lateral acceleration data 404 over a historical time range that is prior to the current operation of the tire. The operating range learning module 318 uses the time-shifted road wheel angle data 406 and the lateral acceleration data 404 to determine a current slope 410 for the vehicle. The operating range learning module 318 can use the time-shifted road wheel angle data 406 and the lateral acceleration data 404 over a time range closer to or associated with the current operation of the vehicle. A first slope 408 of the reduced tire model and a current slope 410 associated with current operation of the vehicle are input to the tire capacity prediction module 320. The tire capacity prediction module 320 compares the current slope 410 to the first slope 408 to predict a remaining tire capacity 412 of the tire.

Figure 5:
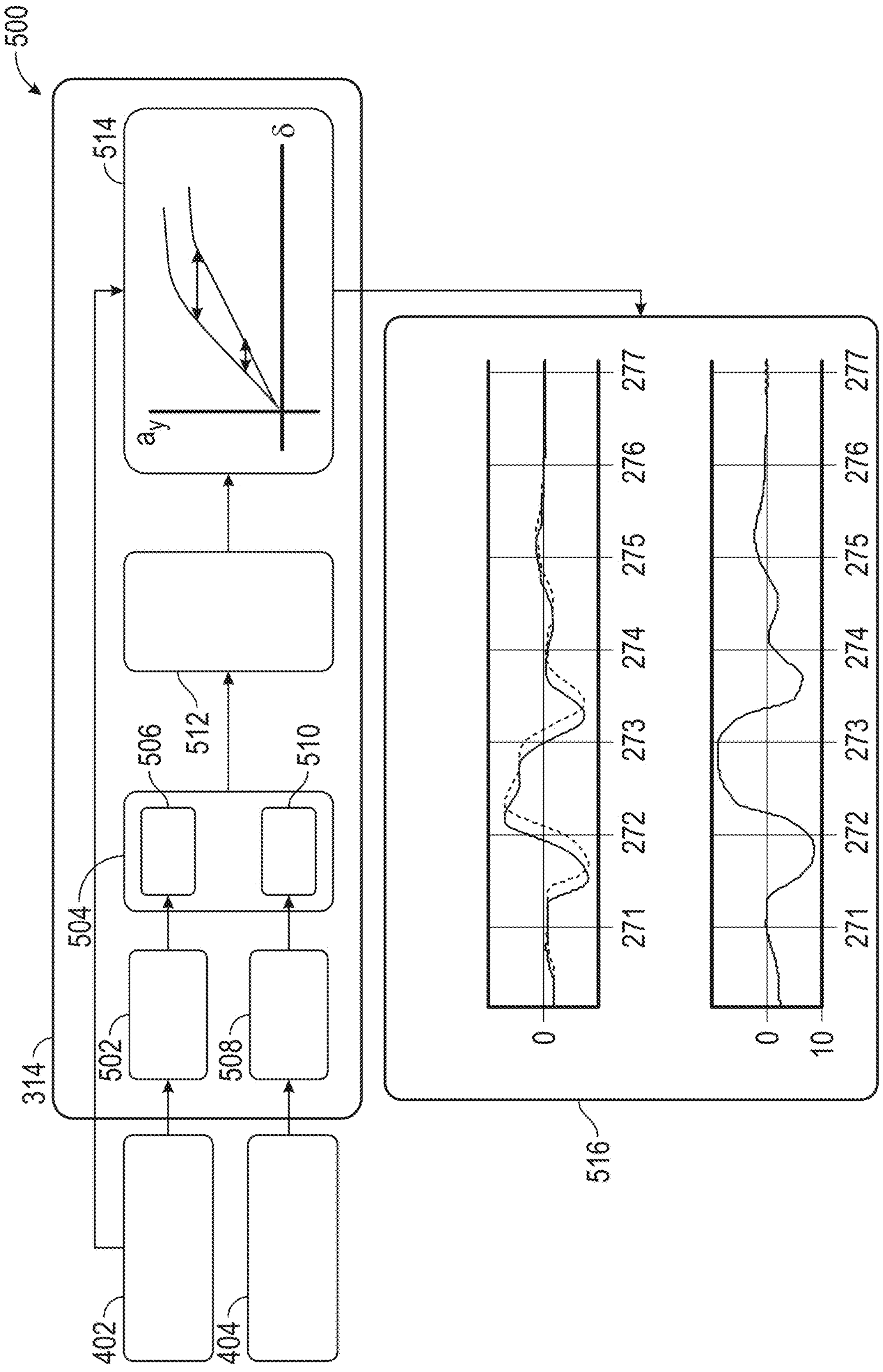
FIG. 5 shows a diagram of an illustrative operation of the data alignment module.

FIG. 5 shows a diagram 500 of an illustrative operation of the data alignment module 314. A first stream of road wheel angle data 402 is obtained, measured or monitored. The first stream of data includes a plurality of road wheel angles temporally spaced apart. A first sampler 502 samples the first stream to detect a change in the road wheel angle. A counter 504 includes a first clock 506 and a second clock 510. The first clock 506 places a timestamp on each of the road wheel angle measurements following the detected change in the road wheel angle.

A second stream of lateral acceleration data 404 is obtained, measured or monitored. The second stream of data includes a plurality of lateral accelerations temporally spaced apart. A second sampler 508 samples the second stream to detect a change in the lateral acceleration. The second clock 510 places a timestamp on each of the lateral acceleration measurement following the detected change in lateral acceleration.

The counter 504 outputs a time difference $\tau_{time\_difference}$ between each timestamp of the road wheel angle and of the lateral acceleration corresponding to the road wheel angle. In this manner, the data alignment module 314 learns a response time between the application of a road wheel angle at the vehicle and the resulting lateral acceleration of the vehicle. A moving average module 512 computes a moving average $\tau_{sync}$ of the time differences $\tau_{time\_difference}$ calculated by the counter 504. A synchronization module 514 time-shifts the road wheel angle measurements using the moving average $\tau_{sync}$ to temporally align with the lateral acceleration. The synchronization module 514 outputs the time-aligned road wheel angle measurements 516.

Figure 6:
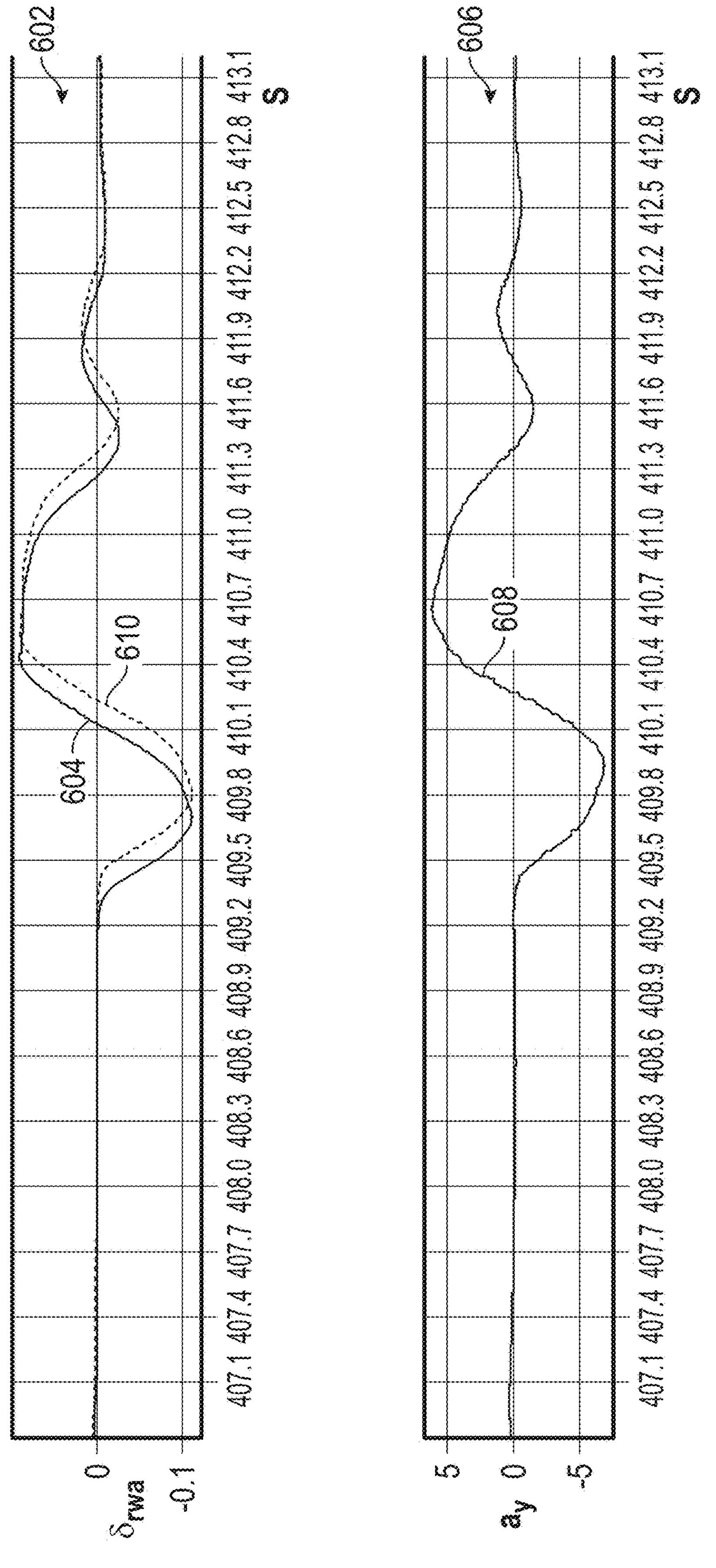
FIG. 6 shows graphs of a road wheel angle and lateral acceleration.

FIG. 6 shows graphs of a road wheel angle and lateral acceleration. A first graph 602 shows a first stream 604 of data including road wheel angle measurements and a second graph 606 shows a second stream 608 of data including related lateral acceleration measurements. The second stream 608 has a time delay with respect to the first stream 604. The data alignment module 314 shifts the first stream 604 forward in time to form a third stream 610 (time-aligned road wheel angle) that is aligned with the second stream 608.

Figure 7:
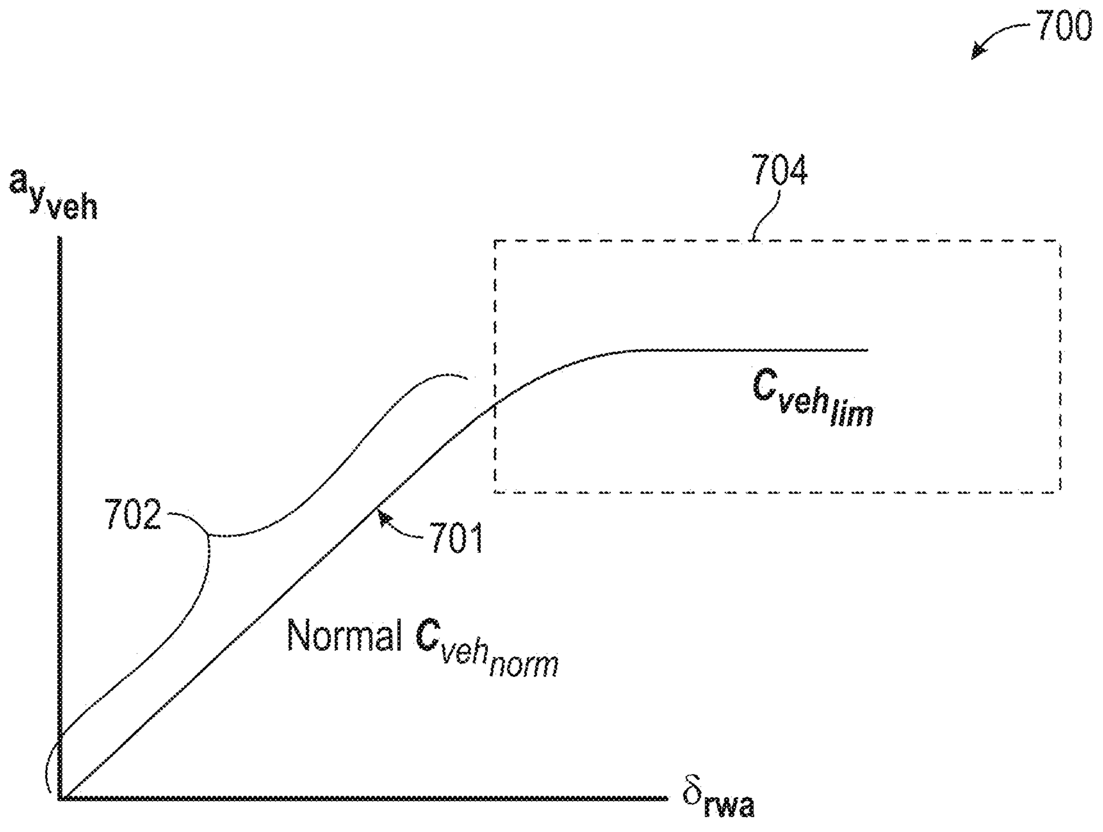
FIG. 7 shows a reduced tire model in an illustrative embodiment.

FIG. 7 shows a reduced tire model 700 in an illustrative embodiment. Road wheel angle ($\delta_{rwa}$) is shown along the abscissa and lateral acceleration ($a_y$) is shown along the ordinate axis. Lateral acceleration data is plotted against road wheel angle data and a regression analysis is performed to obtain the reduced tire model 700. The reduced tire model 700 (indicated by curve 701) includes a normal operating region 702 indicative of normal operation of the tire and a traction limit region 704 indicative of a saturated range of tire operation.

Each region of the reduced tire model 700 has a characteristic slope. The slope is indicated by Eq. (1):

$$C_{veh} = a_{y\_veh}/\delta_{rwa} \quad \text{Eq. (1)}$$

The normal operating region 702 is characterized by a normal slope $C_{veh\_norm}$, which indicates that the lateral acceleration increases generally linearly with road wheel angle in the first quadrant. The traction limit region 704 generally occurs above a selected road wheel angle and selected lateral acceleration and is characterized by a traction limit slope $C_{veh\_lim}$. The traction limit slope $C_{veh\_lim}$ can have a zero slope or substantially zero slope.

Figure 8:
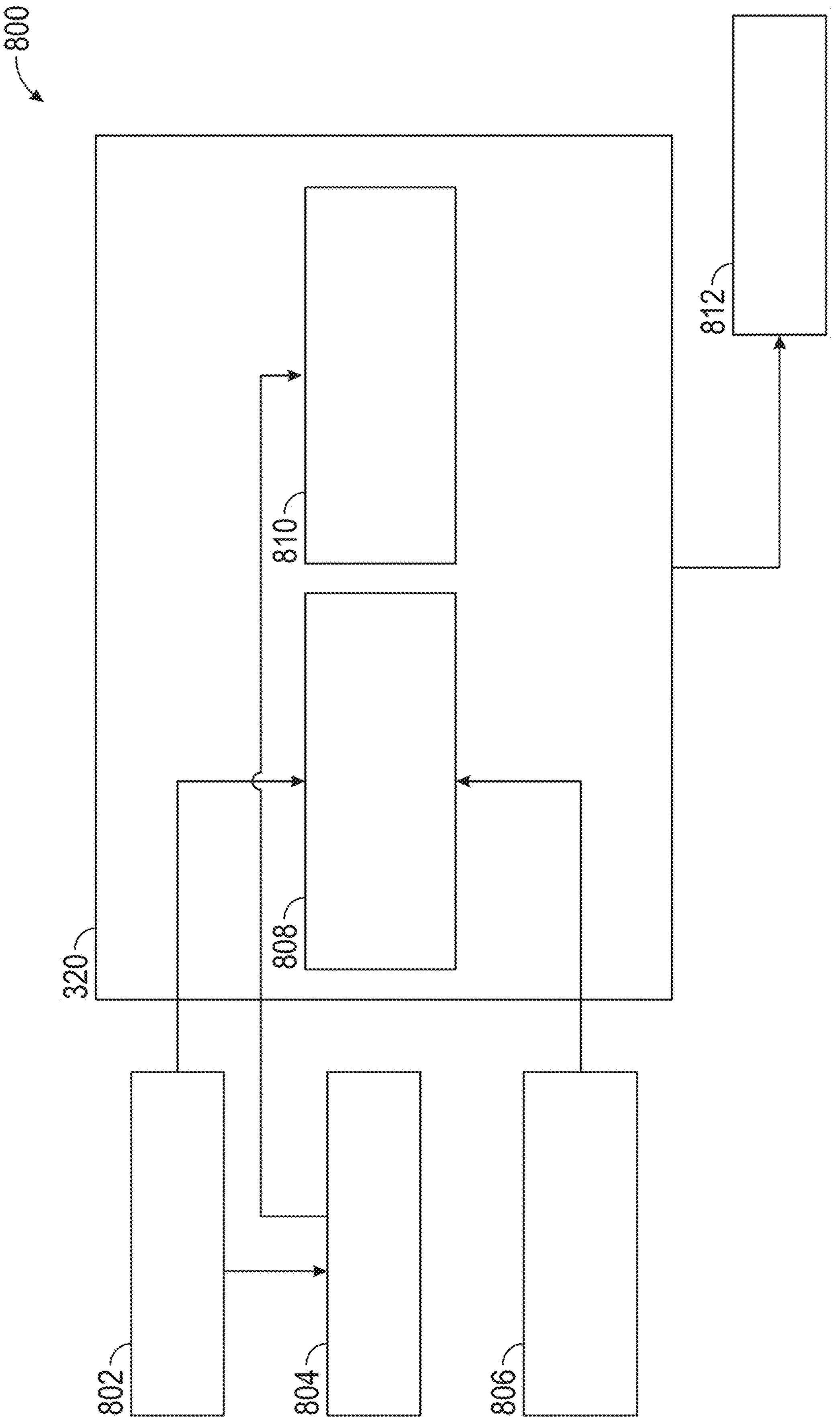
FIG. 8 shows a flowchart illustrating operation of the tire capacity prediction module.

FIG. 8 shows a flowchart 800 illustrating operation of the tire capacity prediction module 320. In box 802, the traction limit slope of the traction limit region 704 of the reduced tire model 700 is determined. In box 804, a normal slope of the normal operating region 702 of the reduced tire model 700 is determined. In box 806, a current slope of the tire is determined. In box 808, the current slope is compared to the traction limit slope to determine if the current slope is approaching the traction limit slope. In box 810, the normal slope is observed to determine whether it is decreasing or reaching a plateau (flattening). In box 812, the results of box 808 and of box 810 are used to predict the remaining tire capacity of the tire.

Figure 9:
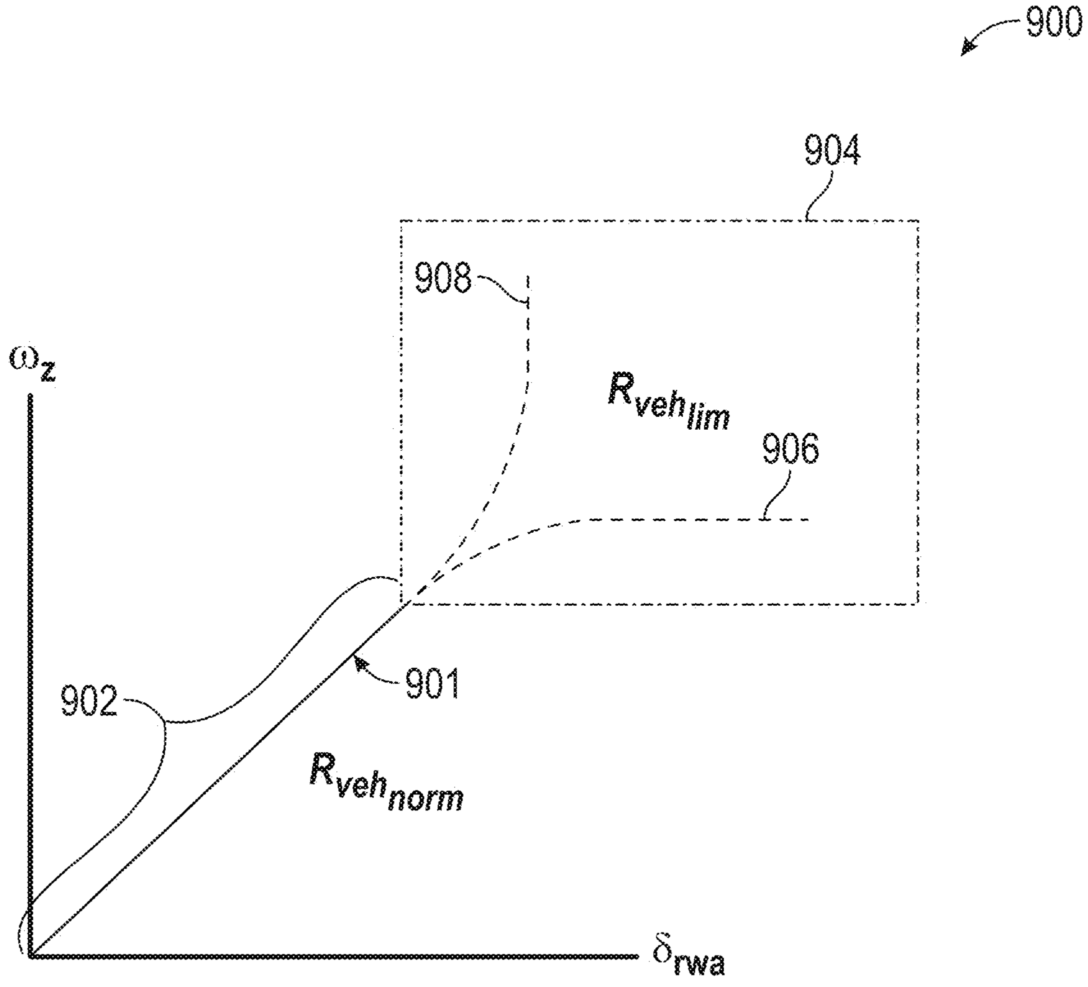
FIG. 9 shows a yaw relation model between yaw angle of the vehicle and road wheel angle, in an illustrative embodiment.

FIG. 9 shows a yaw relation model 900 between yaw angle of the vehicle and road wheel angle, in an illustrative embodiment. Road wheel angle ($\delta_{rwa}$) is shown along the abscissa and yaw rate ($\omega_2$) is shown along the ordinate axis. Yaw data is plotted against road wheel angle data and a regression analysis is performed to obtain the yaw relation model 900. The yaw relation model 900 is indicated by curve 901. The yaw relation model 900 includes a normal region 902 corresponding to normal yaw operation of the vehicle and a yaw limit region 904 indicative of a saturated range of operation of the vehicle.

Each region along the yaw relation model 900 is characterized by a slope. The slope is as shown in Eq. (2):

$$R_{veh} = \omega_z/\delta_{rwa} \quad \text{Eq. (2)}$$

The normal region 902 is characterized by a normal yaw slope $R_{veh\_norm}$ in which the yaw rate increases generally linearly with road wheel angle in the first quadrant. The yaw limit region 904 occurs above a selected road wheel angle and selected yaw rate and is characterized by a yaw relation having a yaw limit slope $R_{veh\_lim}$ that deviates from this normal yaw slope $R_{veh\_norm}$. In a scenario in which tire saturation occurs in the front axle of the vehicle, the curve 901 has a first slope 906 which is generally flat (i.e., the value of the first slope is zero or substantially zero). In a scenario in which tire saturation occurs in the rear axle of the vehicle, the curve 901 has a second slope 908 that approaches a vertical line (i.e., the value of the second slope approaches infinity).

The normal slope $C_{veh}$ of the lateral dynamics is related to various model parameters of the vehicle, such as front axle tire capacity $C_f$ and rear axle capacity $C_r$. A change in the normal slope $C_{veh}$ is a sum of a change in a front axle tire capacity $C_f$ and a change in a rear axle tire capacity $C_r$, as shown in Eq. (3):

$$\Delta C_{veh} = \Delta C_f + \Delta C_r \quad \text{Eq. (3)}$$

A ratio of change in the rear axle tire capacity $\Delta C_r$ to change in front axle tire capacity $\Delta C_f$ is equivalent to a ratio between the yaw limit slope $R_{veh\_lim}$. to the normal yaw slope $R_{veh\_norm}$, as shown in Eq. (4):

$$\frac{\Delta C_r}{\Delta C_f} = \frac{R_{veh\_lim}}{R_{veh-norm}} \quad \text{Eq. (4)}$$

These model parameters can thus be calculated based on the tire capacity model and the yaw model, specifically based on the normal yaw slope and the yaw limit slope. Given the relation of Eq. (4), the front axle tire capacity $C_f$ and the rear axle tire capacity $C_r$ can be updated with time, as shown in Eqs. (5) and (6):

$$C_f(t+1) = C_f(t) + \Delta C_f \quad \text{Eq. (5)}$$

$$C_r(t+1) = C_r(t) + \Delta C_r \quad \text{Eq. (6)}$$

Figure 10:
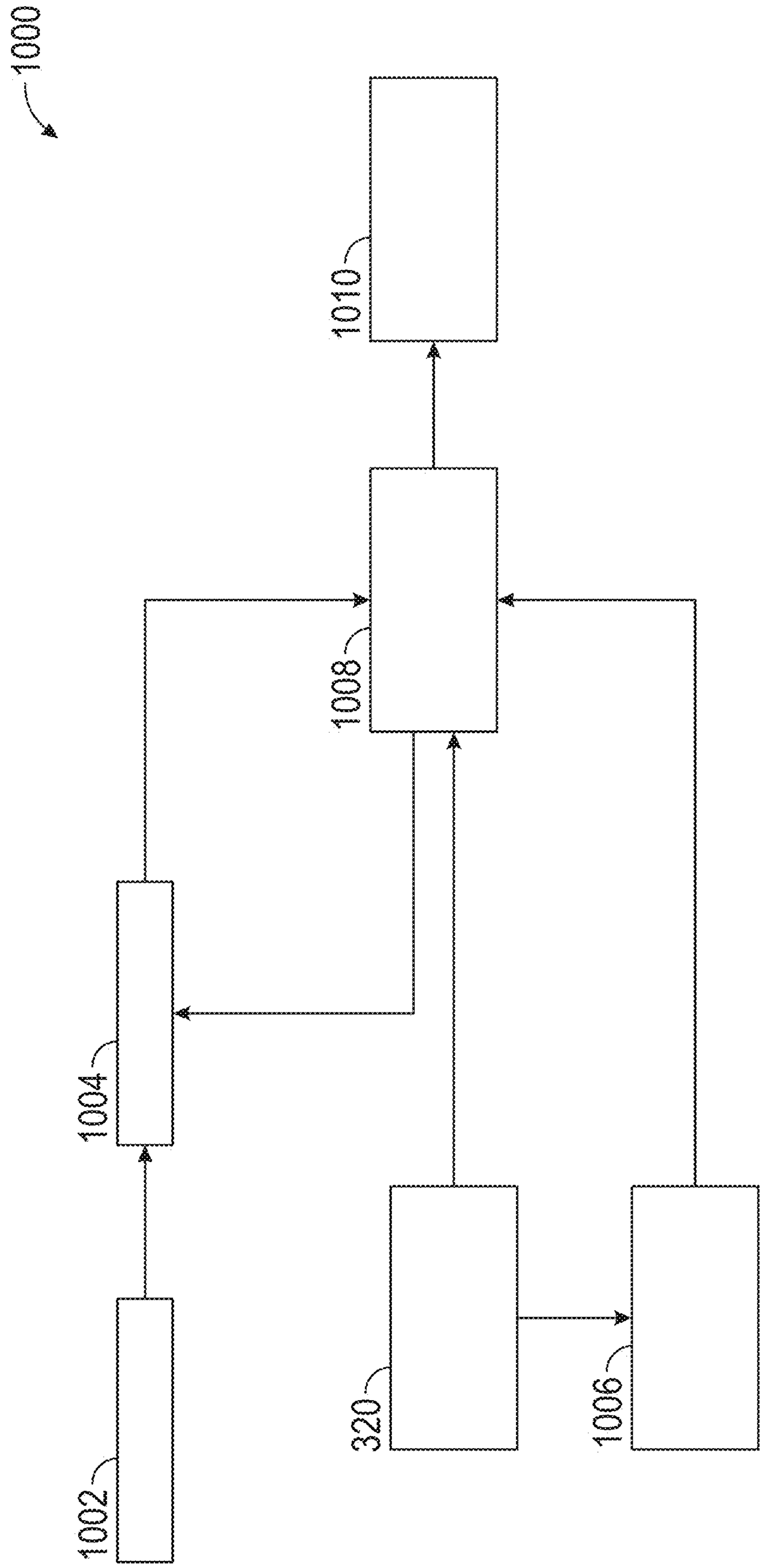
FIG. 10 is a diagram illustrating a process for generating a steering command based on a tire capacity.

FIG. 10 is a diagram 1000 illustrating a process for generating a steering command based on a tire capacity. The diagram 1000 includes one or more perception devices 1002 (e.g., camera, radar, Lidar), a trajectory planning module 1004, the tire capacity prediction module 320, an adaptive vehicle model 1006, and a model predictive controller 1008. The one or more perception devices 1002 obtain data indicative of a surrounding environment and any objects therein. Such data can be related to other vehicles, lane markings, traffic signals etc. The trajectory planning module 1004 generates a reference trajectory for the vehicle based on the data from the one or more perception devices 1002. The reference trajectory is output to the model predictive controller 1008. The model predictive controller 1008 can provide information back to the trajectory planning module 1004 to aid in future reference trajectory planning. For example, such information can include a maximum achievable lateral acceleration and/or a maximum achievable yaw rate for the vehicle.

The tire capacity prediction module 320 outputs the predicted tire capacity (including updated values of model parameters $C_f$ and $C_r$) to the adaptive vehicle model 1006. The adaptive vehicle model 1006 computes a dynamic state of the vehicle using the updated values of $C_f$ and $C_r$. The dynamic state is provided to the model predictive controller 1008. The tire capacity prediction module 320 also outputs an adaptation command to the model predictive controller 1008 upon detection of an impending tire saturation. Upon receiving the adaptation command, the model predictive controller 1008 adjusts internal weights and references to modify or control vehicle behavior to adapt to the tire saturation condition.

The model predictive controller 1008 performs an optimization process to output a target trajectory and/or suitable steering command using the reference trajectory, the vehicle state and the predicted tire capacity. The steering command is provided to the electronic power steering 1010, which moves the vehicle along the target trajectory. The target trajectory provides a smoother control or improved control over the vehicle.

Figure 11:
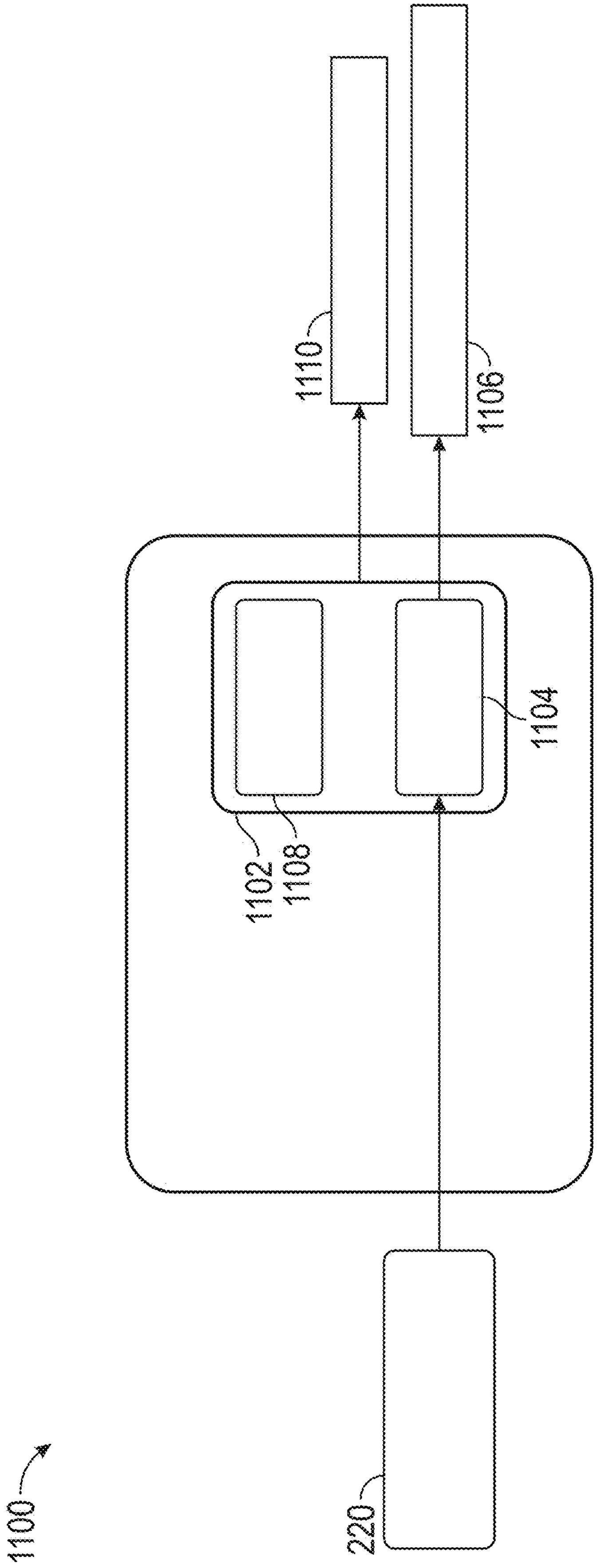
FIG. 11 is a diagram illustrating operation of an evaluation module to determine a need for a trajectory adjustment.

FIG. 11 is a diagram 1100 illustrating operation of an evaluation module 1102 to determine a need for a trajectory adjustment. The evaluation module 1102 receives a prediction of tire capacity from the tire capacity prediction module 320. A first algorithm 1104 evaluates whether the predicted tire capacity is near a saturation limit for the tire. When the predicted tire capacity is near the saturation limit, a first warning signal 1106 can be sent out (i.e., to the display 110) to alert the operator that the operation of the vehicle is nearing a non-linear region.

A second algorithm 1108 receives a predicted yaw rate and compares the predicted yaw rate to a desired yaw rate. When the tire capacity is near the saturation limit and the yaw rate has deviated from the desired yaw rate, a second warning signal 1110 can be sent out (i.e., to the display 110) that the vehicle is operating in the non-linear region of operation. The first algorithm 1104 is proactive and can detect that the vehicle is approaching the non-linear region of operation before the second algorithm 1108 can detect the non-linear region.

Figure 12:
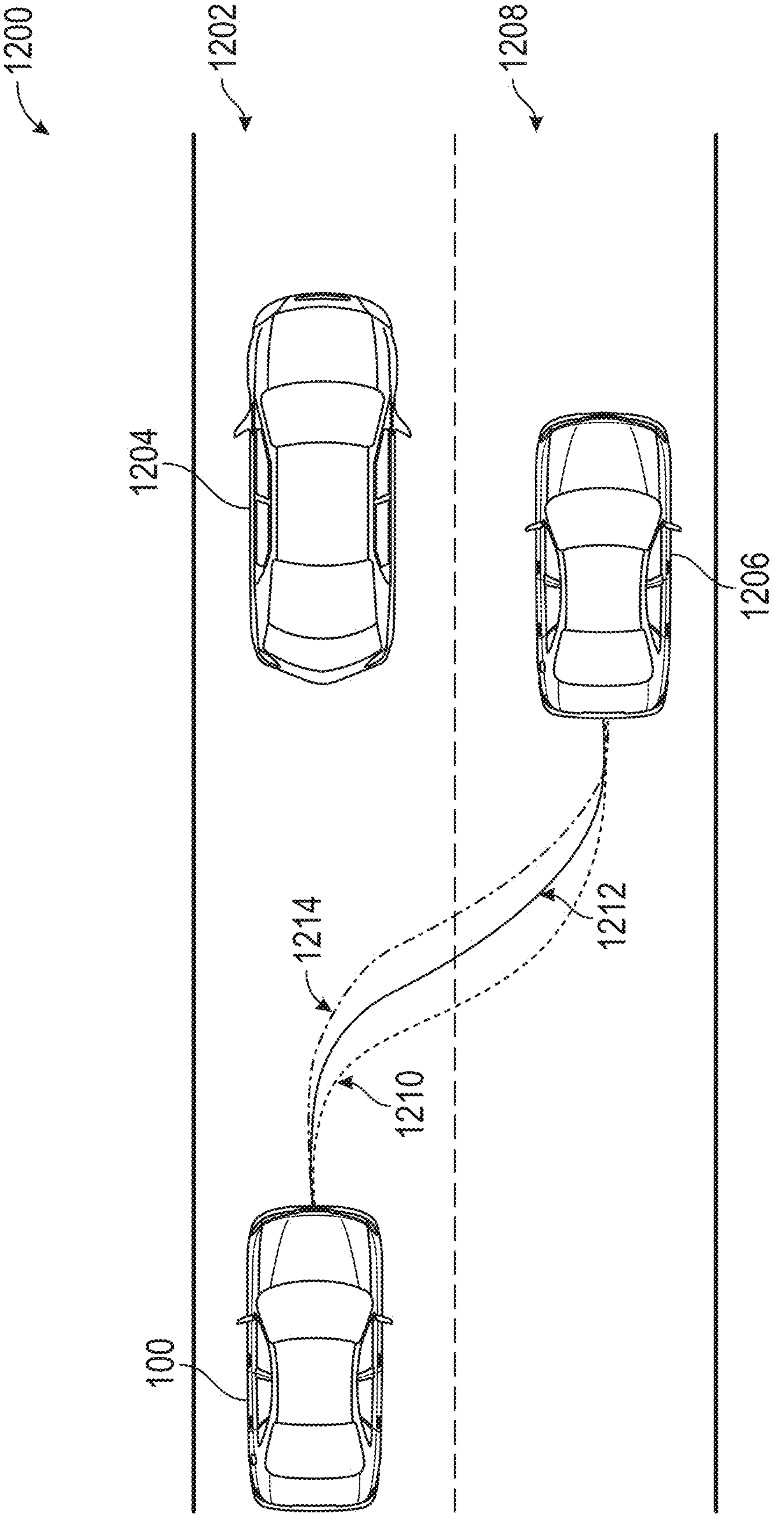
FIG. 12 shows a lane change scenario for the vehicle for illustrative purposes.

FIG. 12 shows a lane change scenario 1200 for the vehicle for illustrative purposes. The vehicle 100 is located in a first lane 1202 with its straight-line path obstructed by an object 1204. To avoid the object 1204, the vehicle 100 plans a reference trajectory 1210 for moving into a new location 1206 in a second lane 1208 adjacent to the first lane 1202. The reference trajectory 1210 is tracking outside of a predicted tire capacity limit 1212 for the vehicle. The predicted tire capacity limit 1212 is used to estimate a maximum lateral deviation that the controller can track. A target trajectory 1214 is therefore calculated to account for the tire capacity limit. A lateral deviation of the target trajectory 1214 is calculated by adding a safety margin to the maximum lateral deviation in the predicted tire capacity limit 1212. The target trajectory 1214 is used to maneuver the vehicle into the second lane 1208.

The terms "a" and "an" do not denote a limitation of quantity, but rather denote the presence of at least one of the referenced item. The term "or" means "and/or" unless clearly indicated otherwise by context. Reference throughout the specification to "an aspect", means that a particular element (e.g., feature, structure, step, or characteristic) described in connection with the aspect is included in at least one aspect described herein, and may or may not be present in other aspects. In addition, it is to be understood that the described elements may be combined in any suitable manner in the various aspects.

When an element such as a layer, film, region, or substrate is referred to as being "on" another element, it can be directly on the other element or intervening elements may also be present. In contrast, when an element is referred to as being "directly on" another element, there are no intervening elements present.

Unless specified to the contrary herein, all test standards are the most recent standard in effect as of the filing date of this application, or, if priority is claimed, the filing date of the earliest priority application in which the test standard appears.

Unless defined otherwise, technical and scientific terms used herein have the same meaning as is commonly understood by one of skill in the art to which this disclosure belongs.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A method of operating a vehicle, comprising:

obtaining a first stream of data related to road wheel angle for the vehicle;

obtaining a second stream of data related to lateral acceleration for the vehicle;

determining a reduced tire model for the vehicle using the first stream of data and the second stream of data;

obtaining a measurement of a current road wheel angle and a measurement of a current lateral acceleration;

determining a current slope from the current road wheel angle and the current lateral acceleration;

comparing the current slope to the reduced tire model to predict a level of saturation of a tire of the vehicle;

controlling a steering actuator of the vehicle to steer the vehicle based on the level of saturation of the tire; and learning a yaw relation model for the vehicle and adjusting a model parameter of an adaptive vehicle model based on a comparison of a current yaw slope to a normal yaw slope of the yaw relation model and a yaw limit slope of the yaw relation model.

2. The method of claim 1, further comprising shifting the first stream of data in time to generate a third stream of data including time-shifted road wheel angle data, the third stream of data aligned with the second stream of data and determining the reduced tire model using the third stream of data and the second stream of data.

3. The method of claim 1, wherein the reduced tire model includes a normal slope and a traction limit slope, further comprising comparing the current slope to the normal slope and the traction limit slope to predict the level of saturation.

4. The method of claim 1, wherein the model parameter includes at least one of: (i) a front axle tire capacity; and (ii) a rear axle tire capacity.

5. The method of claim 1, further comprising sending a signal to a display when one of: (i) a predicted tire capacity is near a traction limit; and (ii) the predicted tire capacity is near the traction limit and a yaw rate has deviated from a desired yaw rate.

6. The method of claim 1, further comprising adding a safety margin in excess of a maximum lateral deviation allowed by the reduced tire model to obtain a target trajectory for the vehicle when a lateral deviation of a reference trajectory exceeds the maximum lateral deviation.

7. A system for operating a vehicle, comprising:

a sensor for obtaining a first stream of data related to road wheel angle for the vehicle and a second stream of data related to lateral acceleration for the vehicle;

a processor configured to:

determine a reduced tire model for the vehicle using the first stream of data and the second stream of data;

obtain a measurement of a current road wheel angle and a measurement of a current lateral acceleration;

determine a current slope from the current road wheel angle and the current lateral acceleration;

compare the current slope to the reduced tire model to predict a level of saturation of a tire of the vehicle;

control a steering actuator of the vehicle to steer the vehicle based on the level of saturation of the tire; and learn a yaw relation model for the vehicle and adjust a model parameter of an adaptive vehicle model based on a comparison of a current yaw slope to a normal yaw slope of the yaw relation model and a yaw limit slope of the yaw relation model.

8. The system of claim 7, wherein the processor is further configured to shift the first stream of data in time to generate a third stream of data including time-shifted road wheel angle data, the third stream of data aligned with the second stream of data and determining the reduced tire model using the third stream of data and the second stream of data.

9. The system of claim 7, wherein the reduced tire model includes a normal slope and a traction limit slope and the processor is further configured to compare the current slope to the normal slope and the traction limit slope to predict the level of saturation.

10. The system of claim 7, wherein the model parameter includes at least one of: (i) a front axle tire capacity; and (ii) a rear axle tire capacity.

11. The system of claim 7, wherein the processor is further configured to send a signal to a display when one of: (i) a predicted tire capacity is near a traction limit; and (ii) the predicted tire capacity is near the traction limit and a yaw rate has deviated from a desired yaw rate.

12. The system of claim 7, wherein the processor is further configured to add a safety margin in excess of a maximum lateral deviation allowed by the reduced tire model to obtain a target trajectory for the vehicle when a lateral deviation of a reference trajectory exceeds the maximum lateral deviation.

13. A vehicle, comprising:

a sensor for obtaining a first stream of data related to road wheel angle for the vehicle and a second stream of data related to lateral acceleration for the vehicle;

a steering actuator for steering the vehicle;

a processor configured to:

determine a reduced tire model for the vehicle using the first stream of data and the second stream of data;

obtain a measurement of a current road wheel angle and a measurement of a current lateral acceleration;

determine a current slope from the current road wheel angle and the current lateral acceleration;

compare the current slope to the reduced tire model to predict a level of saturation of a tire of the vehicle;

control the steering actuator to steer the vehicle based on the level of saturation of the tire; and learn a yaw relation model for the vehicle and adjust a model parameter of an adaptive vehicle model based on a comparison of a current yaw slope to a normal yaw slope of the yaw relation model and a yaw limit slope of the yaw relation model.

14. The vehicle of claim 13, wherein the processor is further configured to shift the first stream of data in time to generate a third stream of data including time-shifted road wheel angle data, the third stream of data aligned with the second stream of data and determining the reduced tire model using the third stream of data and the second stream of data.

15. The vehicle of claim 13, wherein the reduced tire model includes a normal slope and a traction limit slope and the processor is further configured to compare the current slope to the normal slope and the traction limit slope to predict the level of saturation.

16. The vehicle of claim 13, wherein the processor is further configured to send a signal to a display when one of: (i) a predicted tire capacity is near a traction limit; and (ii) the predicted tire capacity is near the traction limit and a yaw rate has deviated from a desired yaw rate.

17. The vehicle of claim 13, wherein the processor is further configured to add a safety margin in excess of a maximum lateral deviation allowed by the reduced tire model to obtain a target trajectory for the vehicle when a lateral deviation of a reference trajectory exceeds the maximum lateral deviation.

18. The method of claim 1, wherein the model parameter includes a front axle tire capacity and a rear axle tire capacity, and wherein adjusting the model parameter includes calculating a ratio of change in the rear axle tire capacity to change in the front axle tire capacity based on a ratio between the yaw limit slope and the normal yaw slope.

19. The system of claim 7, wherein the model parameter includes a front axle tire capacity and a rear axle tire capacity, and wherein the processor is further configured to adjust the model parameter by calculating a ratio of change in the rear axle tire capacity to change in the front axle tire capacity based on a ratio between the yaw limit slope and the normal yaw slope.

20. The vehicle of claim 13, wherein the model parameter includes a front axle tire capacity and a rear axle tire capacity, and wherein the processor is further configured to adjust the model parameter by calculating a ratio of change in the rear axle tire capacity to change in the front axle tire capacity based on a ratio between the yaw limit slope and the normal yaw slope.

* * * * *